US008339312B2

(12) United States Patent
Krueger et al.

(10) Patent No.: US 8,339,312 B2
(45) Date of Patent: Dec. 25, 2012

(54) METHOD AND DEVICE FOR ESTIMATION OF THE INTEGRITY RISK IN A SATELLITE NAVIGATION SYSTEM

(75) Inventors: Jan M. W. Krueger, Munich (DE); Hans L. Trautenberg, Ottobrunn (DE)

(73) Assignee: Astrium GmbH, Taufkirchen (DE)

( * ) Notice: Subject to any disclaimer, the term of this patent is extended or adjusted under 35 U.S.C. 154(b) by 265 days.

(21) Appl. No.: 12/731,311

(22) Filed: Mar. 25, 2010

(65) Prior Publication Data

US 2010/0289696 A1    Nov. 18, 2010

(30) Foreign Application Priority Data

Apr. 6, 2009  (DE) .................. 10 2009 016 337

(51) Int. Cl.
 *G01S 19/20*  (2010.01)
(52) U.S. Cl. .................................. 342/357.58
(58) Field of Classification Search ............. 342/357.58; 701/476
See application file for complete search history.

(56) References Cited

U.S. PATENT DOCUMENTS

2010/0033369 A1    2/2010    Trautenberg

FOREIGN PATENT DOCUMENTS

| DE | 102004012039 A1 | 10/2005 |
| EP | 1965219 A1 * | 9/2008 |
| EP | 2017636 A1 | 1/2009 |

OTHER PUBLICATIONS

Blomenhofer et al, "Investigation of the GNSS/Galileo Integrity Performance for Safety of Life Applications,"Proc. of European GNSS, Jul. 2005, pp. 1-12.*
Oehler et al., The Galileo Integrity Concept, ION GNSS. International Technical Meeting of the Satellite Division of the Institute of Navigation, Washington, DC, US, Sep. 21, 2004, pp. 604-615, XP002375520 p. 607, pp. 1-609, col. 2.
Amarillo et al., Implementation and Testing of Galileo User Integrity Algorithms: New developments for the User Integrity Processing with Galileo, 4th ESA Workshop on Satellite Navigation User Equipment Technologies (NAVITEC'2008),Oct. 12, 2008, ESTEC-ESA, Noordwijk, The Netherlands.
Mach et al., Making GNSS Integrity Simple and Efficient—A New Concept Based on Signal-in-Space Error Bounds, ION GNSS 06, pp. 1-12, Sep. 2006, USA.

* cited by examiner

*Primary Examiner* — Gregory C Issing
(74) *Attorney, Agent, or Firm* — Leydig, Voit & Mayer, Ltd.

(57) ABSTRACT

A method for estimating an integrity risk in a satellite navigation system includes receiving a plurality of navigation signals at a user system from at least one satellite, the plurality of navigation signals including data relative to the integrity of the satellite navigation system; and estimating the integrity risk using the data in the at least one user system. The estimating further includes forming a plurality of intervals of an integration variable of an integral function, estimating a maximum of the integrity risk for each interval, comparing the maximum of each interval to find an overall maximum of all the intervals; and using the overall maximum as an estimate of the integrity risk.

14 Claims, 1 Drawing Sheet

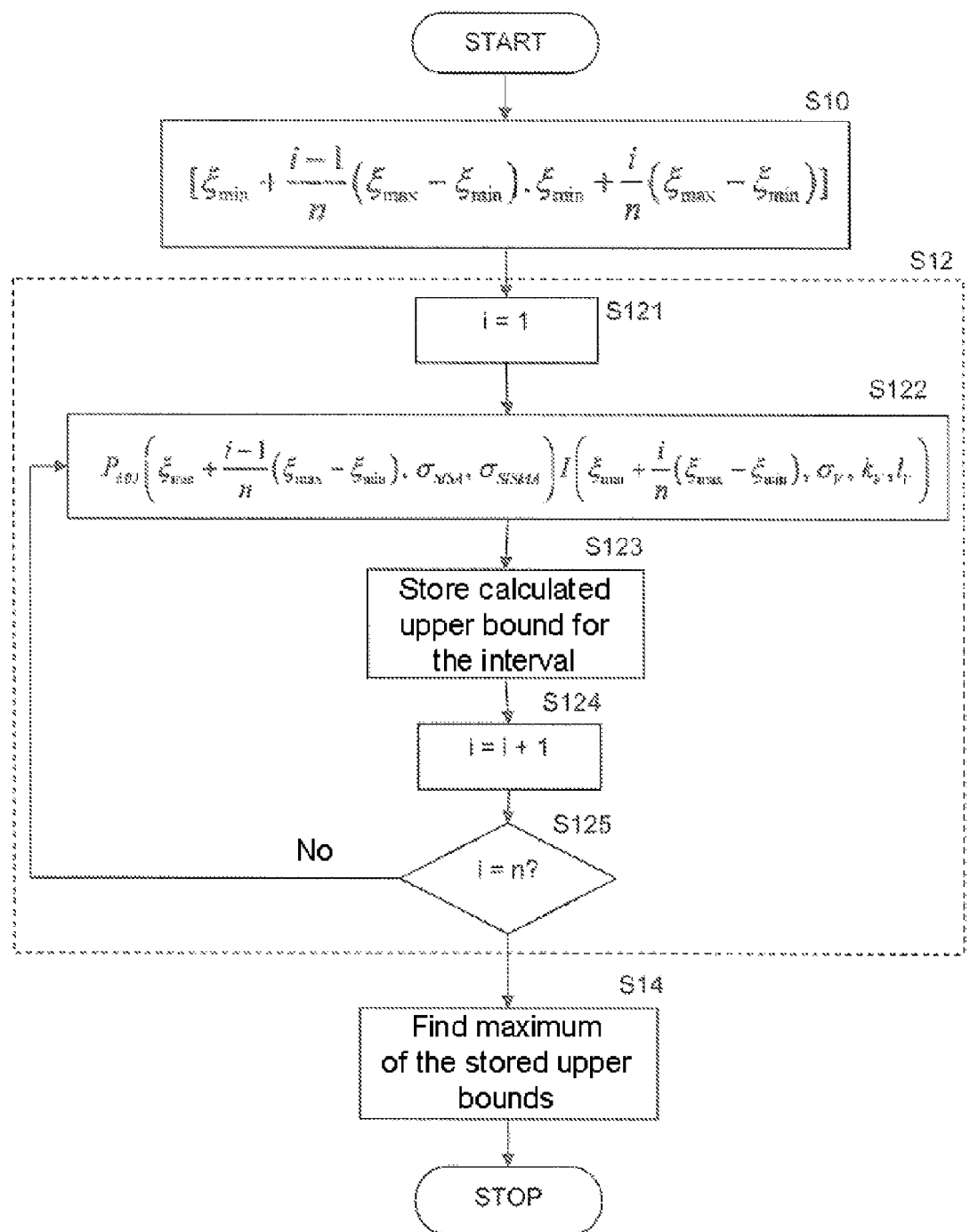

METHOD AND DEVICE FOR ESTIMATION OF THE INTEGRITY RISK IN A SATELLITE NAVIGATION SYSTEM

Priority is claimed to German Patent Application No. DE 10 2009 016 337.9, filed Apr. 6, 2009, the entire disclosure of which is incorporated by reference herein.

The invention relates to a method and a device for estimating the integrity risk in a satellite navigation system.

BACKGROUND

Global navigation satellite systems (GNSS; satellite navigation system for short) are used for position determination and navigation on the ground and in the air. GNSS systems, such as the European satellite navigation system currently under construction (also referred to hereinafter as the Galileo system or Galileo for short), comprise a satellite system (space segment) comprising a number of satellites, a receiving means system (ground segment) on the surface of the earth, connected to a central computation station and comprising a plurality of ground stations and Galileo sensor stations (GSS), and user systems, which evaluate and make use of the satellite signals transmitted by the satellites by radio communication, in particular for navigation. From the space segment, each satellite emits a signal characterising the satellite, the Signal in Space (SIS). The SIS comprises in particular data on the orbit of the satellite and a timestamp for the time of transmission, which are used to detect the position of a user or user system.

Precise detection of the position of a user requires integrity in a GNSS. In particular, Integrity firstly means that the GNSS is capable of warning a user within a particular period of time if parts of the GNSS are not to be used for navigation, for example if system components fail, and secondly that the user can have confidence in the navigation data which he receives by means of satellite navigation signals from the satellites of the GNSS, and in particular can rely on the accuracy of the received navigation data.

The Galileo integrity concept provides that the following data are transmitted to user systems by means of the navigation signals:
  data concerning the accuracy of the transmitted navigation signal for each satellite, i.e. a signal in space accuracy (SISA) for satellites as a measure of the quality of an SIS of a satellite;
  status reports on the accuracy of the monitoring of the satellite by the ground segment, i.e. a signal in space monitoring accuracy (SISMA) for each satellite; and
  an integrity signal in the form of a simple error display for an incorrect SIS of a satellite "Not OK" (known as the integrity flag IF) and the threshold for reporting that the error in an SIS of a satellite is no longer acceptable, also known as the IF threshold.

These data make it possible for a user system itself to quantify and evaluate the integrity and the integrity risk.

For Galileo, the SIS's of the satellites are monitored within the ground segment by evaluating the measurements of the individual Galileo sensor stations (GSS). The GSS measurements are processed in a central integrity processing site in the ground segment to determine the integrity data, listed above, which are to be broadcast to the user systems.

Using the known positions of the GSS's in the integrity processing site, the current position, the instantaneous deviation of the broadcast timescale from the system timescale, and the signal properties of a satellite, and thus the maximum error of the satellite or the signal emitted by said satellite in space, known as the signal in space error (SISE), are estimated.

A prediction of the distribution of the SISE can be represented by a normal distribution with the smallest possible standard deviation. This prediction is represented by the aforementioned signal in space accuracy (SISA), which is broadcast from the ground segment to the user systems via the satellites of the space segment. Using the SISA it is possible to describe the difference between the current 4-dimensional position (orbit and time) of a satellite and the predicted 4-dimensional position found in a navigation message.

However, estimating the SISE is an error-prone process. For this reason, it is generally assumed that the distribution of the current SISE about the value of the estimated SISE can be described by a normal distribution with the standard deviation represented by the aforementioned signal in space monitoring accuracy (SISMA). SISMA is thus a measure of the accuracy of the estimate of the SISE for a satellite in the ground segment and is also transmitted to the user system from the ground segment via selected satellites of the space segment. In the Galileo system, the SISMA values for the satellites are transmitted approximately every 30 seconds. To minimise the integrity risk, the respective largest SISMA value for each satellite out of the SISMA values determined in a measurement period is transmitted. A large SISMA value in this case represents a low accuracy of the satellite monitoring by the ground segment and thus reflects an increased integrity risk for a user.

A detailed description of the Galileo integrity concept can be found in the publication "The Galileo Integrity Concept", V. Oehler, F. Luongo, J.-P. Boyero, R. Stalford, H. L. Trautenberg, J. Hahn, F. Amarillo, M. Crisci, B. Schlarmann, J. F. Flamand, ION GNSS $17^{th}$ International Technical Meeting of the Satellite Division, 21-24 Sep. 2004, Long Beach, Calif.

SUMMARY OF THE INVENTION

As stated above, a user system can itself estimate the integrity risk, so as to be able to decide whether received navigation signals should be used to determine the position or whether they should be disregarded based on an excessively high integrity risk. It is therefore of particular importance for the performance of a user system that the estimate of the integrity risk is as reliable and accurate as possible.

An aspect of the present invention is to provide a method and a device for estimating the integrity risk in a satellite navigation system.

An embodiment of the invention is based on determining the integrity risk by finding the maximum of an integral function to determine the integrity risk, and on using for this purpose a plurality of data, such as SISA and SISMA, which are relevant to the integrity of the satellite navigation system and are broadcast to user systems via satellites by means of navigation signals. The maximum of the integral function is then found in accordance with an essential idea of the invention, in that initially, intervals of the integration variable of the integral function are formed, and subsequently, the maximum of the integrity risk for each interval formed is estimated, and lastly, the maximum over all of the intervals is formed as the estimate of the integrity risk. Therefore, instead of carrying out a conventional method for finding the maximum of the integral function to determine the integrity risk, which would be extremely complex, a conservative estimate of the maximum is established. The interval formation means that the conservative estimate can be altered selectively; for example, using the number of selected intervals, it is possible to determine precisely how many calculation steps are required to estimate or calculate of the integrity risk, and this may be of great significance for the real-time capabilities of an algorithm based on the invention. Furthermore, the selection of the number of intervals can alter the computing time required to estimate the integrity risk and the accuracy. For example, increasing the number of intervals makes it possible to improve the accuracy of the estimate, whereas reducing the number of intervals makes it possible to reduce the computing time. By contrast, in conventional search algorithms for the maximum, the estimate found for the maximum increases as the number of search steps increases. Thus, an increase in the number of search steps and the resulting increase in the number of arithmetic operations only reduce the risk of the maximum not being found and an excessively small value being found. However, unlike with the present invention, increasing the calculation time does not also increase the accuracy of the estimate of the integrity risk.

One embodiment of the invention thus relates to a method for estimating the integrity risk in a satellite navigation system, in which a plurality of data relevant to the integrity of the satellite navigation system, such as SISA and SISMA in Galileo, are broadcast to user systems via satellites by means of navigation signals, the data being used by a user system to estimate the integrity risk in that the maximum of an integral function is found, to determine the integrity risk, by:

forming intervals of the integration variable of the integral function, estimating the maximum of the integrity risk for each interval formed, and using the maxima estimated for each interval formed to find the maximum over all of the intervals as the estimate of the integrity risk.

With this method, the integrity risk can be estimated efficiently, for example by a user system. Above all, this method can be implemented in the form of an algorithm in a user system, allowing the navigation and position determination using the user system to be improved, for example in that settings for the estimation of the integrity risk are enabled for a user, and these settings affect the running of the method, in particular by altering the formation of intervals.

The estimation of the maximum of the integrity risk for each interval formed may in particular comprise the calculation of an upper bound for the integrity risk in each interval. The upper bound for the integrity risk may in this case be calculated according to a formula which is also used to calculate an upper bound for the integrity risk over the entire range of the integration variable, adjusted for the appropriate interval.

The formation of intervals of the integration variable of the integral function comprises in particular the division of the interval $[\xi_{min}, \xi_{max}]$ into n intervals of equal length according to the formula:

$$\left[\xi_{min} + \frac{i-1}{n}(\xi_{max} - \xi_{min}), \xi_{min} + \frac{i}{n}(\xi_{max} - \xi_{min})\right],$$

in which $\xi$ is the integration variable, and in each interval the upper bound for the integrity risk can be calculated according to the following formula:

$$P_{MD}\left(\xi_{min} + \frac{i-1}{n}(\xi_{max} - \xi_{min}), \sigma_{SISA}, \sigma_{SISMA}\right)/$$

-continued
$$\left(\xi_{min} + \frac{i}{n}(\xi_{max} - \xi_{min}), \sigma_V, k_V, I_V\right),$$

in which $P_{MD}$ is the probability of the undesired event of an error detection and I is the probability of the undesired event of an effect on the application. The formula above is the formula which is normally used to calculate an upper bound for the integrity risk over the entire range of the integration variable in the Galileo integrity concept and has been specially adapted to the individual intervals and the boundaries thereof.

Finding the maximum over all of the intervals comprises in particular finding the maximum of the upper bounds calculated for all of the intervals and using the maximum determined in this way as the estimate of the integrity risk. In other words, the maximum of all the upper bounds found is thus used as an estimate of the integrity risk, and this simplifies the integrity risk estimation by comparison with a conventional method for finding the maximum of the integral function to calculate the integrity risk, but leads to viable results with a reasonable and above all adjustable computation time because of the estimation using upper bounds.

In a further embodiment, the invention relates to a computer program for carrying out a method according to the invention and as disclosed above when the computer program is run on a computer.

Further, one embodiment of the invention relates to a data carrier on which the computer program according to the invention and as disclosed above is stored. For example, the data carrier may be a diskette, CD-R, DVD, memory card or the like.

A further embodiment of the invention relates to a device for estimating the integrity risk in a satellite navigation system, in which a plurality of data relevant to the integrity of the satellite navigation system, such as SISA and SISMA in Galileo, are broadcast to user systems via satellites by means of navigation signals, the device being configured to use the data to estimate the integrity risk in that the maximum of an integral function is found by the device to determine the integrity risk, by:

forming intervals of the integration variable of the integral function, estimating the maximum of the integrity risk for each interval formed, and using the maxima estimated for each interval formed to find the maximum over all of the intervals as the estimate of the integrity risk.

The device can above all be configured to carry out a method according to the invention and as disclosed above. For example, the device may be provided as an integrated circuit, in particular as an ASIC or PGA. Alternatively, the device may also be provided as a processor which is configured, by means of a program stored in a memory, to carry out the calculation steps of the method according to the invention and as described above.

According to a further embodiment of the invention, a user system for a satellite navigation system is provided and is configured to receive navigation signals of the satellite navigation system and to carry out a method according to the invention and as disclosed above. The user system may for example be a navigation device having an integrated receiver for navigation signals or a computer having an attached receiver for navigation signals. The user system may also be in the form of a mobile telephone, in particular what is known as a smart phone or another mobile electronic device with an integrated receiver for satellite navigation signals. For professional applications such as air travel, the user system can also be implemented as modules and for example be configured for installation in an aircraft.

The user system may further be distinguished in that it comprises a device according to the invention and as disclosed above.

Further advantages and possible applications of the present invention may be taken from the following description in connection with the embodiments shown in the drawings.

BRIEF DESCRIPTION OF THE DRAWINGS

The description, the claims, the abstract and the drawings use the terms and associated reference numerals in the list of reference numerals provided at the end.

The single FIGURE of the drawings shows a flow chart of an embodiment of the method for estimating the integrity risk in a satellite navigation system according to the invention.

DETAILED DESCRIPTION

The present invention is based on the estimation of the integrity risk as explained in "Implementation and Testing of Galileo User Integrity Algorithms: New developments for the User Integrity Processing with Galileo" by F. Amarillo and D'Angelo, P., 4$^{th}$ ESA Workshop on Satellite Navigation User Equipment Technologies (NAVITEC'2008), Oct. 12, 2008, ESTEC-ESA, Noordwijk, The Netherlands. Accordingly, in Galileo the integrity risk $R_V$ can be calculated as the maximum of the following integral function:

$$R_V = \int_{\xi_{min}}^{\xi_{max}} P_{OC} p d f_{OC}(\xi) P_{MD}(\xi, \sigma_{SISA}, \sigma_{SISMA})/(\xi, \sigma_V, k_V, l_V) d\xi$$

in which $P_{OC}$ is the probability for an "individual SIS" for non-nominal conditions, pdf($\xi$) is the probability density function of an undesired event in terms of the parameter $\xi$, $P_{MD}(\xi, \sigma_{SISA}, \sigma_{SISMA})$ is the probability of an undesired event of an error detection, and $I(\xi, \sigma_V, k_V, l_V)$ is the probability of an undesired event of an effect on the application.

However, in practice it is difficult, if not completely impossible, to formulate a probability density function in connection with the non-nominal conditions. However, an upper bound can be placed on $R_V$ as follows:

$$R_V < \int_{\xi_{min}}^{\xi_{max}} P_{OC} p d f_{OC}(\xi)$$

$$\max_{\xi_{min} < \xi < \xi_{max}} \{P_{MD}(\xi, \sigma_{SISA}, \sigma_{SISMA})/(\xi, \sigma_V, k_V, l_V)\} d\xi$$

$$R_V < \max_{\xi_{min} < \xi < \xi_{max}} P_{OC} \{P_{MD}(\xi, \sigma_{SISA}, \sigma_{SISMA}) I(\xi, \sigma_V, k_V, l_V)\}$$

$$\int_{\xi_{min}}^{\xi_{max}} p d f_{OC}(\xi) d\xi$$

$$R_V < P_{OC} \max_{\xi_{min} < \xi < \xi_{max}} \{P_{MD}(\xi, \sigma_{SISA}, \sigma_{SISMA})/(\xi, \sigma_V, k_V, l_V)\}$$

An upper bound for $R_V$ can therefore be found by calculating $$\max_{\xi_{min} < \xi < \xi_{max}} \{P_{MD}(\xi, \sigma_{SISA}, \sigma_{SISMA})/(\xi, \sigma_V, k_V, l_V)\}$$

To be able to carry out this calculation in an acceptable computing time, the following procedure is adopted in accordance with the invention:

1. Initially, the interval $[\xi_{min}, \xi_{max}]$ is divided into n intervals of equal length according to the following formula:

$$\left[\xi_{min} + \frac{i-1}{n}(\xi_{max} - \xi_{min}), \xi_{min} + \frac{i}{n}(\xi_{max} - \xi_{min})\right],$$

in which n is the number of intervals and i takes the values i=1, 2 . . . n.

2. In each interval thus formed, the upper bound $$\max_{\xi_{min}+\frac{i-1}{n}(\xi_{max}-\xi_{min}) < \xi < \xi_{min}+\frac{i}{n}(\xi_{max}-\xi_{min})} \{P_{MD}(\xi, \sigma_{SISA}, \sigma_{SISMA})/$$

$$(\xi, \sigma_V, k_V, l_V)\}$$

for $R_V$ is estimated conservatively for the respective interval by the following equation:

$$R_{Vi} < P_{MD}\left(\xi_{min} + \frac{i-1}{n}(\xi_{max} - \xi_{min}), \sigma_{SISA}, \sigma_{SISMA}\right)/$$

$$\left(\xi_{min} + \frac{i}{n}(\xi_{max} - \xi_{min}), \sigma_V, k_V, l_V\right)$$

A total of n conservatively estimated upper bounds $R_{Vi}$ are thus formed.

3. Subsequently, the maximum over all n intervals of the n upper bounds $R_{Vi}$ thus estimated for the n intervals is found, and this requires less computing time than a complex method for finding the maximum of the integral function $R_V$ and further has the advantage that the selection of the number of intervals can affect the estimation of the integrity risk in terms of calculation accuracy and calculation speed. If a small number of intervals are formed, the calculation speed increases, whilst if more intervals are formed, the calculation speed is reduced, but the accuracy of the estimate increases.

In a normal search for the maximum, it is possible for the maximum found to lie below the maximum. By contrast, in the search according to the invention, the properties of $P_{MD}$ and I ensure that an upper bound for the maximum is found.

The above steps can be implemented fully or only in part in software or hardware. Typically, they are implemented in the form of an algorithm which is implemented in a user system. The algorithm may for example be integrated into a navigation or position determination program.

The single FIGURE shows a flow chart for an algorithm of this type. After the start of the algorithm, in step S10 the range of the integration variable 4 is divided into intervals of equal length in accordance with the aforementioned formula. Subsequently, in step S12 an upper bound is estimated for each interval, as described above. For this purpose, the algorithm initially sets the interval count i to 1 in step S121. In the following step S122 the upper bound for the first interval is then estimated according to the equation described in 2. above. In the following step S123 the upper bound calculated or estimated in this manner is stored. In the next step S124 the interval count is incremented before finally being compared in step S125 with the number n of intervals. If the interval count i is greater than the number n, the algorithm continues to step S14; otherwise, it branches into step S122 so as to carry out steps S122-S124 again for another interval. In step S14, if upper bounds have been calculated for all n intervals, the maximum of the stored upper bounds is found and used as an estimate of the integrity risk.

The invention claimed is:

1. A method for estimating an integrity risk in a satellite navigation system comprising:
   receiving a plurality of navigation signals at a user system from at least one satellite, the plurality of navigation signals including data relevant to the integrity of the satellite navigation system and broadcast to the user system via satellites using navigation signals; and
   estimating the integrity risk using a computer of the user system configured, via a computer program, to perform the following steps:
      forming a plurality of intervals of an integration variable of an integral function, the integration variable of the integral function being determined based on the data;
      estimating a maximum of the integrity risk for each interval;
      comparing the maximum of each interval to find an overall maximum of all the intervals; and
      using the overall maximum as an estimate of the integrity risk.

2. The method as recited in claim 1, wherein estimating the maximum of the integrity risk includes calculating an upper bound for the integrity risk in each interval.

3. The method as recited in claim 2, wherein the forming the plurality of intervals includes dividing the interval into n intervals of equal length according to:

$$\left[\xi_{min} + \frac{i-1}{n}(\xi_{max} - \xi_{min}), \xi_{min} + \frac{i}{n}(\xi_{max} - \xi_{min})\right],$$

wherein $\xi$ is the integration variable, and wherein the calculating the upper bound includes calculating the upper bound according to:

$$P_{MD}\left(\xi_{min} + \frac{i-1}{n}(\xi_{max} - \xi_{min}), \sigma_{SISA}, \sigma_{SISMA}\right) / $$
$$\left(\xi_{min} + \frac{i}{n}(\xi_{max} - \xi_{min}), \sigma_V, k_V, I_V\right),$$

wherein $P_{MD}$ is a probability of an undesired event of an error detection and I is a probability of an undesired event of an effect on the navigation system, and wherein $\sigma$ is a standard deviation.

4. The method as recited in claim 2, wherein the determining the overall maximum includes finding a maximum of the upper bounds for each of the intervals and using the maxima of the upper bounds to find the overall maximum.

5. The method as recited in claim 1, wherein the computer program is stored on a non-transitory data carrier.

6. The method as recited in claim 1, wherein the data includes data concerning the accuracy of the plurality of navigation signals for each of the satellites, known as a signal in space accuracy (SISA), and status reports on the accuracy of a monitoring of the satellite by a ground segment, known as a signal in space monitoring accuracy (SISMA).

7. The method as recited in claim 1, wherein the integration variable of the integral function is determined in accordance with the Galileo integrity concept and represents an estimation of a maximum error of the satellites or the signals emitted by the satellites, known as the signal in space error (SISE).

8. A computer program product comprising:
   a computer usable non-transitory medium having a computer readable program code configured to receive a plurality of navigation signals at a user system from at least one satellite, the plurality of navigation signals including data relevant to the integrity of the satellite navigation system and broadcast to the user system via satellites using navigation signals, and to form a plurality of intervals of an integration variable of an integral function, the integration variable of the integral function being determined based on the data, to estimate a maximum of the integrity risk for each interval, to compare the maximum of each interval to find an overall maximum of all the intervals and to use the overall maximum as an estimate of the integrity risk.

9. The computer program product as recited in claim 8, wherein the computer readable program code is configured to estimate the maximum of the integrity risk includes calculating an upper bound for the integrity risk in each interval.

10. The computer program product as recited in claim 9, wherein the computer readable program code is configured to determine a maximum of the upper bounds for each of the intervals and using the maxima of the upper bounds to find the overall maximum.

11. The computer program product as recited in claim 8, wherein the computer readable program code is configured to divide the interval into n intervals of equal length according to:

$$\left[\xi_{min} + \frac{i-1}{n}(\xi_{max} - \xi_{min}), \xi_{min} + \frac{i}{n}(\xi_{max} - \xi_{min})\right],$$

wherein $\xi$ is the integration variable, and wherein the calculating the upper bound includes calculating the upper bound according to:

$$P_{MD}\left(\xi_{min} + \frac{i-1}{n}(\xi_{max} - \xi_{min}), \sigma_{SISA}, \sigma_{SISMA}\right) / $$
$$\left(\xi_{min} + \frac{i}{n}(\xi_{max} - \xi_{min}), \sigma_V, k_V, I_V\right),$$

wherein $P_{MD}$ is a probability of an undesired event of an error detection and I is a probability of an undesired event of an effect on the navigation system, and wherein $\sigma$ is a standard deviation.

12. The computer program product as recited in claim 8, wherein the computer usable medium is an integrated circuit.

13. The computer program product as recited in claim 8, wherein the data includes data concerning the accuracy of the plurality of navigation signals for each of the satellites, known as a signal in space accuracy (SISA), and status reports on the accuracy of a monitoring of the satellite by a ground segment, known as a signal in space monitoring accuracy (SISMA).

14. The computer program product as recited in claim 8, wherein the integration variable of the integral function is determined in accordance with the Galileo integrity concept and represents an estimation of a maximum error of the satellites or the signals emitted by the satellites, known as the signal in space error (SISE).

* * * * *